Aug. 7, 1945.  T. M. DEAL ET AL  2,381,425
STABILIZER
Filed Nov. 10, 1942  2 Sheets-Sheet 1
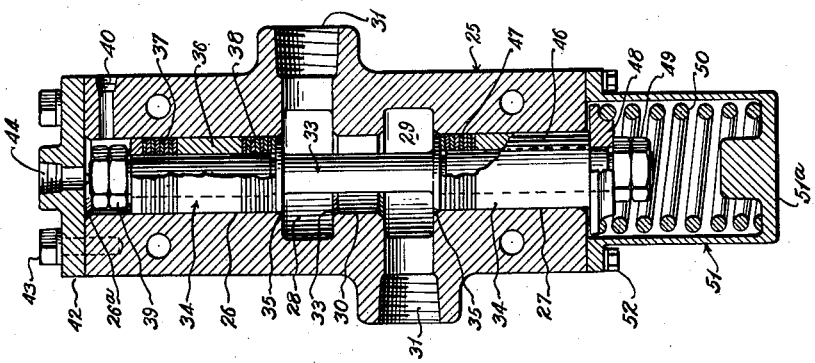
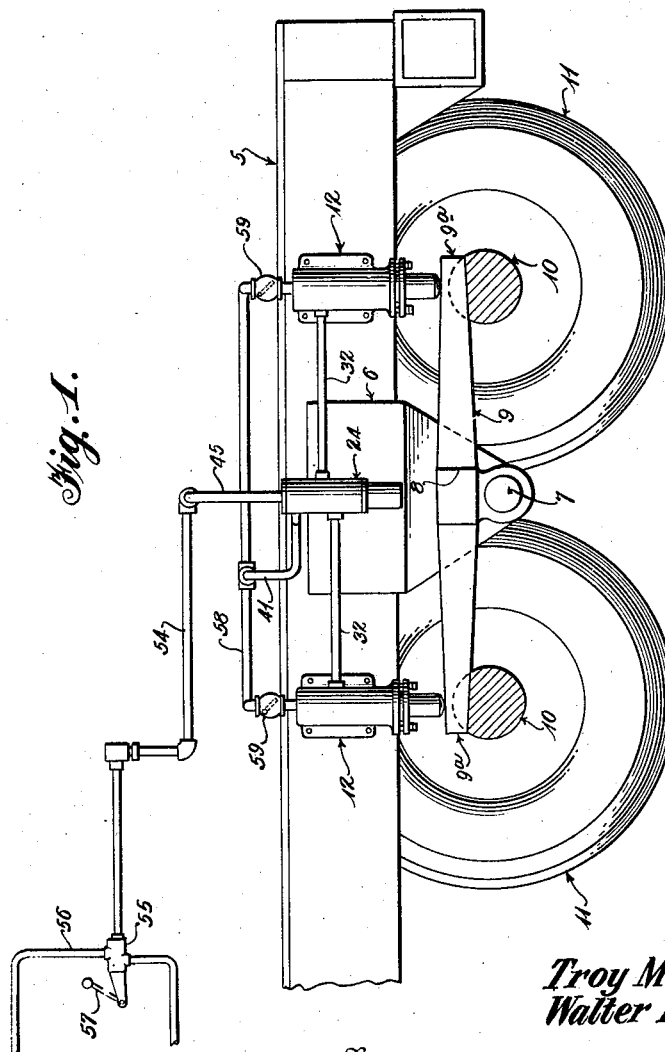
Inventors
Troy M. Deal and
Walter Baker
By
Attorney

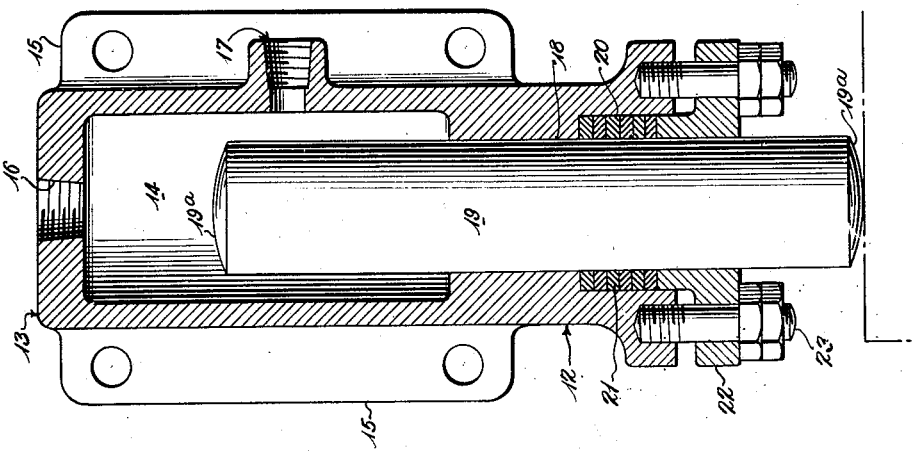
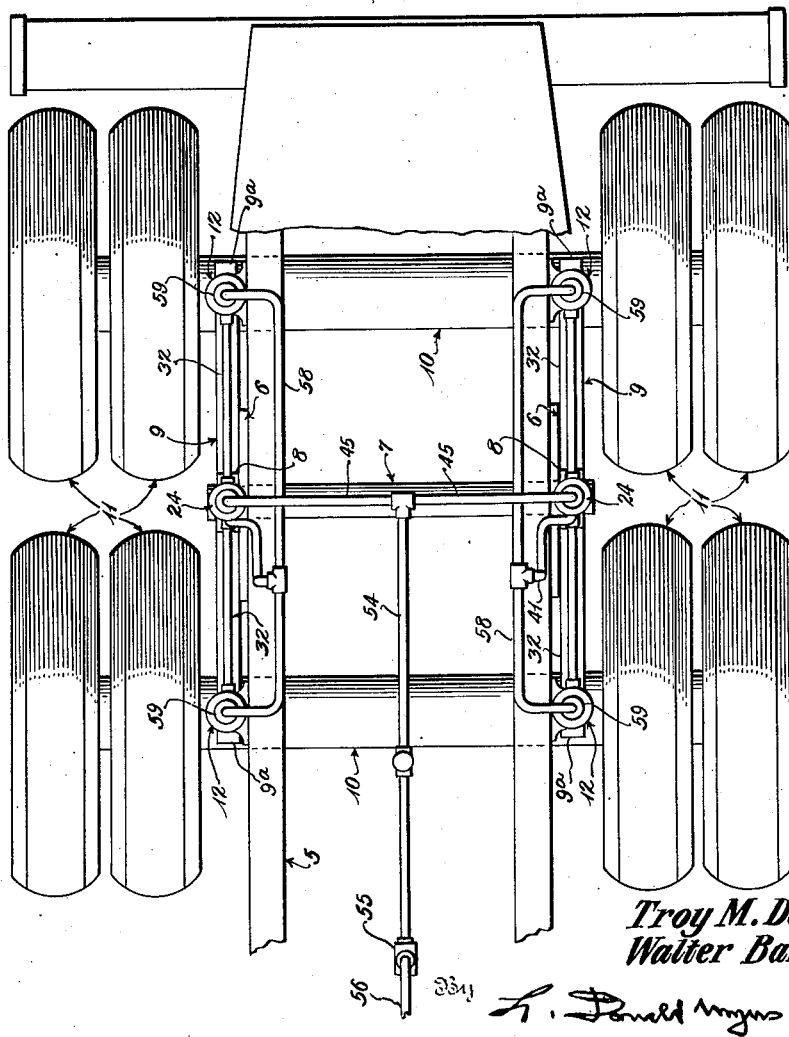

Patented Aug. 7, 1945

2,381,425

UNITED STATES PATENT OFFICE 2,381,425

STABILIZER

Troy M. Deal and Walter Baker, Cedar Rapids, Iowa, assignors to Link-Belt Speeder Corporation, a corporation of Illinois Application November 10, 1942, Serial No. 465,136

12 Claims. (Cl. 280—6)

This invention relates to new and useful improvements in stabilizers for wheeled vehicles.

Certain types of motor propelled wheeled vehicles are particularly adapted for carrying heavy loads and for traveling over irregular ground while in such service. These vehicles usually are equipped with rear axle assemblies which will permit the four or more single or dual wheels to independently follow, or adapt themselves to, irregularities in the surface over which the vehicles travel. To provide this independent wheel action, it is customary to employ a main rear axle, on which the vehicle frame is supported, and a pair of wheel axles, which are arranged in parallelism with each other and with the main axle and one on each side of the latter. Equalizer beams, or the like, are usually employed for pivotally connecting the opposite ends of the main rear axle to the adjacent ends of the wheel axles and for distributing the vehicle load between the wheel axles. With such a rear wheel and axle assembly, the tipping point of the vehicle as a whole will be the main axle.

When vehicles having this general type of rear wheel and axle assembly are employed as transporting mounts for material handling equipment, such as cranes, the vehicles usually remain at rest while performing their intended work. It has been determined that regardless of the character of the surface on which such a vehicle is stopped and its material handling equipment placed in operation, it is desirable to increase the stability of the vehicle frame and its load by immovably connecting or locking both of the side equalizing beams to the vehicle frame, thus transferrng the tipping point of the vehicle body as a whole to the wheel axle located rearwardly of the main axle.

This locking of the equalizing means to the vehicle frame, to prevent pivotal movement of the beams relative to the main axle, may be accomplished by such mechanical devices as chains, screw-jacks, or wedges. As both ends of each beam must be locked to accomplish the desired result, an appreciable amount of time is required for the operator of a vehicle to descend from the cab for the purpose of applying and/or adjusting the several mechanical devices every time the vehicle is stopped. Of course, the several stabilizing devices should be released whenever a vehicle is to be moved to a new location. Occasionally an operator will forget to release the stabilizing devices before starting to travel and serious damage to the vehicle frame, the equalizing means, or the stabilizing devices will be the result.

It is the primary object of this invention to provide hydraulic stabilizing mechanism for wheeled vehicles.

A further important object of the invention is to provide stabilizing mechanism for vehicle rear axle assemblies of the type employing wheel axles which are located on opposite sides of and are pivotally connected by equalizing means to the main rear axle.

Still another object of the invention is the provision of an hydraulic stabilizer system for the axle assemblies of vehicles which are conventionally provided with a source of fluid under pressure which is employed for effecting steering, application of brakes, or the like, and with the stabilizer system being controlled by valve means which may be conveniently located with respect to the operator for manual actuation, or which may be coupled in any suitable manner to a conventional control of the vehicle for simultaneous or alternate actuation.

Other objects and advantages of the invention will be apparent during the course of the following description.

In the accompanying drawings forming a part of this specification and in which like numerals are employed to designate like parts throughout the same, Figure 1 is a side elevational view of the rear end portion of a vehicle frame with the stabilizing mechanism embodying this invention operatively associated with the rear wheel and axle assembly of the vehicle, Figure 2 is a top plan view of the structure shown in Fig. 1, Figure 3 is a detail view, partly in vertical section and partly in elevation, of a cylinder and piston stabilizer device which forms a part of the mechanism shown in Figs. 1 and 2, and Figure 4 is a detail view, with certain parts shown in vertical section and other parts broken away, of one of the relay valve units incorporated in the mechanism of Figs. 1 and 2.

In the drawings, wherein for the purpose of illustration is shown the preferred embodiment of this invention, and first particularly referring to Figs. 1 and 2, the reference character 5 is employed for designating in its entirety the vehicle body that is equipped with the stabilizer mechanism embodying this invention. The opposite sides of this vehicle body 5 have attached thereto the brackets or plates 6 which may be of any desired construction just so they will properly support the main rear axle 7 of the vehicle. No attempt has been made to disclose in detail the construction of this main rear axle as such details form no part of this invention.

Each end portion of the main rear axle 7 has pivotally connected thereto, as by means of the attachment members 8 which can take any desired form, an equalizing beam 9. The rear end portion of the vehicle body 5 is further provided with the two wheel axles 10 which are arranged in parallelism with the main rear axle 7 and are located on opposite sides thereof. These wheel axles 10 may be of any desired construction and are adapted to have mounted on their opposite ends the vehicle supporting wheels 11. Dual wheels are illustrated in Fig. 2 as being mounted on each end portion of each one of the wheel axles 10. It will be understood, however, that a different number of wheels may be employed for each end of each wheel axle if dual wheels are not required. The parallel wheel axles 10 are intended to be suitably connected to the end portions 9a of the beams 9 so as to permit the axles 10 to partake of a certain amount of sliding movement relative to the end portions 9a of the equalizing beams 9 and in directions which are longitudinal of these beams. The wheel axles 10, also, should be permitted to partake of limited movements relative to the end portions 9a of the equalizing beams 9 about axes which extend longitudinally of said beams. In other words, the rear wheel and axle assembly shown in Figs. 1 and 2 is merely intended to be representative of conventional assemblies in which the load of the vehicle frame is supported on the main rear axle 7 by the brackets or plates 6 and is equally distributed between the wheel axles 10 by means of the equalizing beams 9, the mounts 8, and the connections between the end portions 9a of the beams 9 and the wheel axles 10. This type of conventional rear wheel and axle assembly will permit the individual wheels 11 to follow irregularities encountered in traveling over roads or other supporting surfaces. In following these surface irregularities, the wheel axles 10 must be permitted to rise and fall while their axes are maintained in parallelism with the axis of the main rear axle 7 and the wheel axles 10 must be permitted to move relative to the main rear axle 7 and about axes which extend longitudinally of the vehicle frame 5. These latter movements about longitudinal axes occur as a result of the wheel at one end of a wheel axle being required to adapt itself to a surface irregularity which is not encountered by the wheel that is located at the opposite end of the wheel axle. It will be appreciated that with this type of rear wheel and axle assembly, the normal tipping point of the vehicle body as a whole is about the main rear axle 7.

The stabilizing mechanism or system embodying this invention includes a cylinder and piston stabilizer device 12 for each end portion 9a of each equalizing beam 9. One of these stabilizer devices 12 is disclosed in detail in Fig. 3. It includes a cylinder 13 formed with the internal pressure chamber 14. This cylinder is provided with mounting flanges 15 by means of which the cylinder may be attached to a side of the vehicle frame 5. The top wall of the cylinder 13 is provided with a tapped opening 16 which is employed for establishing a proper connection with a refill tube that will be more specifically referred to at a later point. The side wall of the cylinder 13 is provided with a second tapped opening 17 for providing a connection with a closed circuit tube which will be specifically referred to at a later point.

The lower end portion of the cylinder body 13 is bored at 18 to freely slidably accommodate the piston 19. This lower end portion of the cylinder body is further bored at 20 to accommodate suitable packing rings, or the like, 21 which will function to prevent fluid leakage from the cylinder chamber 14. A suitable packing gland ring 22 is adjustably connected to the lower end portion of the cylinder body by means of the screws 23.

The piston 19 preferably is formed from a solid steel rod. By inspecting Fig. 1, it will be seen that the projecting, rounded, lower end of the piston 19 of each stabilizer device is intended to rest or bear against the upper face of the associated end 9a of an equalizing beam 9. It will be appreciated, however, that the means employed for connecting the end of the equalizing beam to the wheel axle may be of such construction that the lower projecting end of the piston may be required to bear against the top of such means. For that reason, language used in the claims to define the engagement of the lower ends of the pistons with the end portions of the equalizing beams should be construed as broadly as possible in the light of the prior art. With the four cylinders 13 properly attached to the opposite sides of the vehicle frame 5 in vertical alignment with the points of connection between the end portions of the wheels axles 10 and the end portions 9a of the equalizing beam 9, and with the four pistons 19 freely movable with respect to the cylinders 13, it will be appreciated that the pistons will remain in engagement with the beam ends and will move inwardly and outwardly of the cylinders as the beam ends rise and fall. It further will be appreciated that anything that is done to prevent movement of the pistons 19 of the two equalizer devices 12 associated with either of the equalizer beams 9 will result in locking that beam against pivotal movement relative to its supporting end of the main rear axle 7. Therefore, by locking all of the pistons 19 of the four stabilizer devices 12 against movement relative to their cylinders 13, both of the equalizing beams 9 will be locked against pivotal movement relative to the ends of the main rear axle 7 and this locking of both beams will effect transfer of the tipping point of the vehicle body 5 as a whole to the wheel axle 10 located rearwardly of the main axle 7. This transfer of the tipping point will increase the wheel base of the vehicle and will render the vehicle body more stable. Of course, locking of the pistons 19 of all of the stabilizer devices 12 will prevent independent pivotal movement of either one of the equalizer beams 9 with the result that no single end portion of either of the wheel axles 10 will be permitted to rise or move upwardly relative to the vehicle frame 5. This increased stability of the vehicle frame 5 is extremely desirable when the vehicle is employed as a transportation mount for crane equipment, or the like, which includes a boom of substantial length that is intended to swing through a working arc relative to the rear portion of the vehicle frame.

The means employed for locking the pistons 19 of the several stabilizing devices against movement relative to their respective cylinders 13 will now be described. Mounted on each side of the vehicle frame 5, and suitably attached to the brackets or plates 6 are the relay valves 24. One of these valve structures is disclosed in detail in Fig. 4. It includes a body casting 25 which is suitably bored to provide the opposed cylinder portions 26 and 27, the enlarged fluid chambers 28 and 29, and the communicating duct or passage 30. Each one of the fluid chambers 28 and 29 is provided with a tapped opening or port 31 for connection with the adjacent end of the closed circuit tubes 32. Figs. 1 and 2 disclose these tubes as extending to and connecting with the tapped openings 17 for the two stabilizer cylinders 13 that are located on the same side of the vehicle frame 5.

A double ended piston rod 33 is positioned within the body casting 25 and has the packed piston assemblies 34 mounted on its opposite end portions. These piston assemblies are operatively associated with the opposed cylinders 26 and 27. Integral flanges 35 are formed on the piston rod 33 and function as inner seats or stops for the packed piston assemblies 34.

The piston assembly 34 that is associated with the cylinder 26 consists of a filler portion 36, an outer packing ring portion 37 and an inner packing ring portion 38. Lock nuts 39 are threaded on the upper end of the piston rod 33 to maintain this piston assembly on its end of the piston rod. A tapped side port 40 is formed in the body casting adjacent the upper end of the cylinder 26. This tapped port 40 is shown in Figs. 1 and 2 as having the section 41 of the refill tubing threaded therein. The upper end of the cylinder 26 is partially closed by the cap 42 that is held in place by the screws 43. This cap is provided with a tapped opening 44 for connection with a branch 45 of a pressure fluid supply tubing, see Figs. 1 and 2. Piston packing 37 functions to prevent leakage of the fluid which is present in and flows through the outer end portion 26a of the cylinder 26 which connects the port 40 and opening 44.

The piston packing portion 38 functions to prevent leakage of fluid from the chamber 28 while the double ended piston assembly is in the position illustrated in Fig. 4.

The piston assembly operatively associated with the cylinder 27 is provided with a filler portion 46 and a packing portion 47. This packing portion is employed for preventing leakage of fluid from the chamber 29. A collar 48 is positioned on the lower end of the piston rod 33, outwardly of the cylinder 27, and is held in place by the lock nuts 49. A compression spring 50 is positioned to bear against the collar 48 at one end. This spring is housed within the cup 51 that is attached to the lower end of the valve body casting 25 by the screws 52. The closed end 51a of this cup functions as a seat for the remaining end of the spring 50.

It will be seen, by inspecting Fig. 4, that the spring 50 will normally function to retain the double ended piston in the position illustrated in Fig. 4. When in this position, fluid will be permitted to flow in either direction through the chambers 28 and 29 and their connecting duct 30. We therefore have the chambers 14 of the two associated cylinders 13, the tubes 32, the chambers 28 and 29 and the duct 30 functioning to provide a closed fluid circuit through which the fluid may flow in either direction as a result of displacement of fluid from one of the cylinder chambers by the inward movement of its piston 19. With this closed fluid circuit unobstructed at any point, the pistons 19 of the associated pair of stabilizer devices 12 will be permitted to freely rise and fall as a result of pivotal movement of their equalizer beam 9. However, if this closed circuit is obstructed at any point intermediate its two cylinder chambers 14, the fluid will not be permitted to circulate back and forth and both of the pistons 19 will be locked against both inward and outward movement. Inward movement of either piston will be prevented by the need for compressing the fluid in the associated cylinder chamber 14. Outward movement of either piston will be prevented by the reduction in pressure which would have to be created in the associated cylinder chamber 14.

Therefore, to effect locking of both of the pistons of the pair of stabilizer devices 12 operatively associated with a given relay valve 24, the closed circuit is obstructed by downward movement of the double piston, against the force exerted by the spring 50, until the upper piston flange 35 seats against the edge 53 of the duct 30. This downward movement of the double ended piston is accomplished by admitting pressure fluid to the upper end portion 26a of the cylinder 26. When the fluid pressure applied to the upper end of the piston assembly is relieved, the spring 50 will return the piston assembly to its normal position, as seen in Fig. 4, and the closed circuit will again be unobstructed for free flow of fluid in either direction.

To provide simultaneous application of pressure fluid to the upper ends of the double piston assemblies for the relay valves 24 located on both sides of the vehicle frame, the two branch pipes 45 are connected to a common pipe line 54 which extends to a control valve 55 that is located in the circulation line 56 operatively connected to a fluid pressure system for the vehicle. This fluid pressure system, not shown, may be employed to effect operation of the steering mechanism of the vehicle or to effect application of its brakes. Such a use is conventional practice and need not be further disclosed or described. The valve 55 may be of any suitable construction which will normally prevent the fluid from flowing through the pressure branch of the circulation line 56 into the common feed pipe 54 and, which when operated, will cause fluid to flow from the pressure branch of the line 56 into the common feed pipe 54 for the branches 45. When the valve 55 is returned to its normal condition, the feed pipe 54 will be connected to the other or return branch of line 56 and spring 50 will cause the double piston to be returned to its normal position. Any suitable form of operating member 57 may be provided for the valve 55. This operating member may be conveniently located with respect to the operator of the vehicle so that it can be manually actuated whenever the several pistons 19 of the stabilizer devices 12 are to be locked against movement. The operating member 57 also can be connected in any suitable manner to one of the conventional controls of the vehicle so that the stabilizing pistons 19 may be locked in any desired timed relation to the actuation of the said vehicle control mechanism.

To make certain that the closed fluid circuits on both sides of the vehicle frame 5 are at all times maintained filled with fluid, the pressure fluid admitted to the upper ends 26a of the two relay valves will be permitted to flow through the refill tube sections 41 into the refill cylinder connecting tube sections 58 which are connected at their opposite ends to the associated cylinders 13 at the tapped openings 16. A check valve 59 is provided at each end portion of each one of the refill tube sections 58 to prevent reverse flow of the fluid employed for refilling the closed circuits.

It now will be appreciated that when the operating valve 55 is conditioned for preventing flow of fluid into the feed pipe 54, the pistons 19 of the several stabilizer devices 12 will be permitted to move freely inwardly and outwardly of their cylinders 13 but when the operating valve 55 is conditioned to cause the pressure fluid to flow from the circulating line 56 into the feed pipe 54, the pistons 19 of the four stabilizer devices will be simultaneously locked against movement relative to their cylinders. The simultaneous locking of all four pistons will prevent both of the equalizer beams 9 from pivoting relative to the ends of the main axle 7.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. The combination with a vehicle frame, a main axle supporting the frame, a pair of wheel axles positioned one forwardly and one rearwardly of the main axle, and equalizing means connecting each end portion of the main axle to the adjacent end portions of both wheel axles to permit the wheel axle end portions to move relative to each other and to the vehicle frame to accomodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, and control means for effecting simultaneous stoppage of flow of fluid through said separate tubing to render the pistons of all of the stabilizing devices immovable relative to their cylinders.

2. The combination with a vehicle frame, a main axle supporting the frame, a pair of wheel axles positioned one forwardly and one rearwardly of the main axle, and equalizing means connecting each end portion of the main axle to the adjacent end portions of both wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, a valve interposed in the tubing for each pair of cylinders and operable to permit or prevent flow of fluid between the cylinders, and control means for simultaneously operating both of said valves to render the pistons of all of the stabilizing devices either movable or immovable relative to their cylinders.

3. The combination with a vehicle frame, a main axle supporting the frame, a pair of wheel axles positioned one forwardly and one rearwardly of the main axle, and an equalizing beam on each side of the vehicle frame pivotally connected to the adjacent end portion of the main axle and connected at its ends to the adjacent portions of the wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, a valve interposed in the tubing for each pair of cylinders and operable to permit or prevent flow of fluid between the cylinders, and control means for simultaneously operating both of said valves to render the pistons of all of the stabilizing devices either movable or immovable relative to their cylinders.

4. The combination with a vehicle frame, a main axle supporting the frame, a pair of wheel axles positioned one forwardly and one rearwardly of the main axle, an equalizing means connecting each end portion of the main axle to the adjacent end portions of both wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, fluid flow control means interposed in the tubing for each pair of cylinders and operable to permit or prevent flow of fluid between the cylinders, a source of supply of fluid under pressure, and means operable by fluid from said source for simultaneously actuating the fluid flow control means for both pairs of cylinders.

5. The combination with a vehicle frame, a main axle supporting the frame, a pair of wheel axles positioned one forwardly and one rearwardly of the main axle, and an equalizing beam on each side of the vehicle frame pivotally connected to the adjacent end portion of the main axle and connected at its ends to the adjacent end portions of the wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, fluid flow control means interposed in the tubing for each pair of cylinders and operable to permit or prevent flow of fluid between the cylinders, a source of supply of fluid under pressure, means operable by fluid from said source for actuating the fluid flow control means for each pair of cylinders, and a valve common to both of said fluid operable means for simultaneously controlling the flow of fluid to both of said last mentioned means.

6. The combination with a vehicle frame, a main axle supporting the frame, a pair of wheel axles positioned one forwardly and one rearwardly of the main axle, an equalizing means connecting each end portion of the main axle to the adjacent end portions of both wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, a valve interposed in the tubing for each pair of cylinders and operable to permit or prevent flow of fluid between the cylinders, a source of fluid under pressure, means operable by fluid from said source for actuating the valve for each pair of cylinders, and a valve common to both of said fluid operable means for simultaneously controlling the flow of fluid to both of said last mentioned means.

7. The combination with a vehicle frame, a main axle supporting the frame, a pair of wheel axles positioned one forwardly and one rearwardly of the main axle, an equalizing means connecting each end portion of the main axle to the adjacent end portions of both wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle frame to permit fluid to flow between the same in a closed circuit, fluid flow control means interposed in the tubing for each pair of cylinders and operable to permit or prevent flow of fluid between the cylinders, a source of fluid under pressure, means for maintaining said closed circuits filled from said source of fluid, and means operable by fluid from said source for simultaneously actuating the fluid flow control means for both pair of cylinders.

8. The combination with a vehicle frame, a main axle supporting the frame, a pair of wheel axles positioned one frowardly and one rearwardly of the main axle, an equalizing means connecting each end portion of the main axle to the adjacent end portions of both wheel axles to permit the wheel axle end portions to move relative to each other and to the vehicle frame to accommodate irregularities in the ground or road surface over which the vehicle frame travels, of stabilizing mechanism to be operated only when the vehicle frame is stopped to prevent the wheel axle end portions from partaking of movements relative to each other and to the vehicle frame irrespective of the relative positions then occupied by said end portions with respect to each other and to the vehicle frame, said stabilizing mechanism comprising a stabilizing device for each end portion of each one of the wheel axles, each stabilizing device including a cylinder attached to the vehicle frame to move therewith and a piston freely movable in the cylinder and projecting therefrom to rest upon the equalizing means, separate tubing connecting the cylinders positioned on each side of the vehicle to permit flow of fluid between the same in a closed circuit, a valve interposed in the tubing for each pair of cylinders and operable to permit or prevent flow of fluid between the cylinders, a source of fluid under pressure, means for maintaining said closed circuits filled with fluid from said source, means operable by fluid from said source for actuating the valve for each pair of cylinders, and a valve common to both of said fluid operable means for simultaneously controlling the flow of fluid from said source to both of said last mentioned means.

9. The combination with a vehicle frame, a member pivotally connected to the frame to permit its ends to move relative to the vehicle frame, means associated with the ends of the member for supporting the vehicle frame on the ground or road surface over which said frame moves and being movable relative to the frame with the ends of said member to accommodate irregularities in said surface, of stabilizing mechanism to be operated only when the vehicle frame is stopped to prevent said supporting means from partaking of movements relative to the frame irrespective of the relative positions then occupied by the supporting means with respect to said frame, said stabilizing mechanism comprising a cylinder attached to the frame at each end of said member, a piston freely slidable in each cylinder and projecting therefrom to rest on the adjacent end portion of the member, tubing connecting said cylinders for fluid to flow between the latter in a closed circuit, a valve in the tubing operable to permit or prevent such fluid flow, spring means for normally conditioning said valve to permit fluid flow, and means for actuating said valve to condition it to prevent said fluid flow to cause the pistons to be held against movement in their cylinders and the member to be held against pivotal movement relative to the vehicle frame.

10. The combination with a vehicle frame, a member pivotally connected to the frame to permit its ends to move relative to the vehicle frame, means associated with the ends of the member for supporting the vehicle frame on the ground or road surface over which said frame moves and being movable relative to the frame with the ends of said member to accommodate irregularities in said surface, of stabilizing mechanism to be operated only when the vehicle frame is stopped to prevent said supporting means from partaking of movements relative to the frame irrespective of the relative positions then occupied by the supporting means with respect to said frame, said stabilizing mechanism comprising a cylinder attached to the frame at each end of said member, a piston freely slidable in each cylinder and projecting therefrom to rest on the adjacent end portion of the member, tubing connecting said cylinders for fluid to flow between the latter in a closed circuit, a valve in the tubing operable to permit or prevent said fluid flow, means for normally conditioning said valve to permit fluid flow, a fluid motor for actuating said valve to condition it to prevent said fluid flow, and means for controlling operation of said fluid motor to cause the pistons to be held against movement in their cylinders and the member to be held against movement relative to the vehicle frame.

11. The combination with a vehicle frame, a member pivotally connected to the frame to permit its end to move relative to the vehicle frame, means associated with the ends of the member for supporting the vehicle frame on the ground or road surface over which said frame moves and being movable relative to the frame with the ends of said members to accommodate irregularities in said surface, of stabilizing mechanism to be operated only when the vehicle frame is stopped to prevent said supporting means from partaking of movements relative to the frame irrespective of the relative positions then occupied by the supporting means with respect to said vehicle frame, said stabilizing mechanism comprising a cylinder attached to the frame at each end of said member, a piston freely slidable in each cylinder and projecting therefrom to rest on the adjacent end portion of the member, tubing connecting said cylinders for fluid to flow between the latter in a closed circuit, a valve in the tubing operable to permit or prevent said fluid flow, means for normally conditioning said valve to permit fluid flow, a fluid motor for actuating said valve to condition it to prevent said fluid flow, a source of fluid under pressure, and means for controllably connecting said source to the fluid motor to effect operation of the motor so that the pistons will be held against movement in their cylinders and the member will be held against pivotal movement relative to the vehicle frame.

12. The combination with a vehicle frame, a member pivotally connected to the frame to permit its ends to move relative to the vehicle frame, means associated with the ends of the member for supporting the vehicle frame on the ground or road surface over which said frame moves and being movable relative to the frame with the ends of said member to accommodate irregularities in said surface, of stabilizing mechanism to be operated only when the vehicle frame is stopped to prevent said supporting means from partaking of movements relative to the frame irrespective of the relative positions then occupied by the supporting means with respect to said frame, said stabilizing mechanism comprising a cylinder attached to the frame at each end of said member, a piston freely slidable in each cylinder and projecting therefrom to rest on the adjacent end portion of the member, tubing connecting said cylinders for fluid to flow between the latter in a closed circuit, a valve in the tubing operable to permit or prevent said fluid flow, means for normally conditioning said valve to permit fluid flow, a fluid motor for actuating said valve to condition it to prevent said fluid flow, a source of fluid under pressure, a valve for controllably connecting said source to the fluid motor to effect operation of the motor so that the pistons will be held against movement in their cylinders and the member will be held against pivotal movement relative to the vehicle frame, and means for effecting delivery of fluid from said source to the closed circuit for the cylinders to maintain the circuit filled with fluid.

TROY M. DEAL.
WALTER BAKER.